US009493707B2

(12) United States Patent
Oki et al.

(10) Patent No.: US 9,493,707 B2
(45) Date of Patent: Nov. 15, 2016

(54) PROCESS OF PREPARING LAMINATION FILM, LAMINATION FILM AND HEAT SHIELD

(75) Inventors: Kazuhiro Oki, Ashigarakami-gun (JP); Wataru Majima, Ashigarakami-gun (JP); Hidetoshi Watanabe, Ashigarakami-gun (JP); Mitsuyoshi Ichihashi, Ashigarakami-gun (JP)

(73) Assignee: FUJIFILM Corporation, Tokyo (JP)

(*) Notice: Subject to any disclaimer, the term of this patent is extended or adjusted under 35 U.S.C. 154(b) by 669 days.

(21) Appl. No.: 13/048,675

(22) Filed: Mar. 15, 2011

(65) Prior Publication Data

US 2011/0229725 A1 Sep. 22, 2011

(30) Foreign Application Priority Data

Mar. 16, 2010 (JP) ................. 2010-058678

(51) Int. Cl.
| | |
|---|---|
| B05B 5/06 | (2006.01) |
| C09K 19/56 | (2006.01) |
| B32B 37/24 | (2006.01) |
| C09K 19/20 | (2006.01) |
| C09K 19/32 | (2006.01) |
| C09K 19/34 | (2006.01) |
| C09K 19/52 | (2006.01) |
| G02B 5/30 | (2006.01) |
| B32B 38/00 | (2006.01) |
| B32B 38/16 | (2006.01) |
| C09K 19/04 | (2006.01) |

(52) U.S. Cl.
CPC ............. C09K 19/56 (2013.01); B32B 37/24 (2013.01); C09K 19/2007 (2013.01); C09K 19/32 (2013.01); C09K 19/3475 (2013.01); C09K 19/52 (2013.01); G02B 5/3016 (2013.01); B32B 2037/243 (2013.01); B32B 2038/0076 (2013.01); B32B 2038/168 (2013.01); B32B 2310/0831 (2013.01); B32B 2457/202 (2013.01); C09K 2019/0429 (2013.01); C09K 2019/0448 (2013.01); C09K 2019/0481 (2013.01); C09K 2019/328 (2013.01); Y10T 428/31649 (2015.04)

(58) Field of Classification Search
CPC ............. C09K 19/2007; C09K 19/32; C09K 19/3475; C09K 19/52; C09K 19/56; C09K 2019/0429; C09K 2019/0448; C09K 2019/0481; C09K 2019/328; B32B 2037/243; B32B 2038/0076; B32B 2038/168; B32B 2310/0831; B32B 2457/202; B32B 2457/7324; G02B 5/3016; Y10T 428/31649
USPC ................................. 427/160–169
See application file for complete search history.

(56) References Cited

U.S. PATENT DOCUMENTS

| | | | |
|---|---|---|---|
| 6,339,464 B1 * | 1/2002 | Anderson et al. ............ 349/187 |
| 6,421,107 B1 | 7/2002 | Greenfield et al. | |
| 7,029,728 B2 | 4/2006 | Dunn et al. | |
| 2002/0039627 A1 * | 4/2002 | Ichihashi et al. ............ 428/1.1 |
| 2003/0085377 A1 | 5/2003 | Dunn et al. | |
| 2004/0150773 A1 * | 8/2004 | Li et al. ........................ 349/117 |
| 2005/0266158 A1 * | 12/2005 | Pokorny et al. ............. 427/162 |

FOREIGN PATENT DOCUMENTS

| | | |
|---|---|---|
| JP | 4-281403 A | 10/1992 |
| JP | 2001-56484 A | 2/2001 |
| JP | 2002-212561 A | 7/2002 |
| JP | 2003-105030 A | 4/2003 |
| JP | 3500127 B2 | 2/2004 |
| JP | 2005-99248 A | 4/2005 |
| JP | 2005-115359 A | 4/2005 |
| JP | 2005099248 A * | 4/2005 |
| JP | 3745221 B2 | 2/2006 |
| JP | 4008358 B2 | 11/2007 |
| JP | 4109914 B2 | 7/2008 |
| JP | 2009-514022 A | 4/2009 |
| WO | 2005/026830 A1 | 3/2005 |
| WO | 2007/050433 A1 | 5/2007 |

OTHER PUBLICATIONS

Machine Translation of JP 2005099248 A.*
http://www.nanophotonics.org.uk/niz/publications/powell-2011. pdf, accessed Dec. 27, 2013, Powell et al, "Chiral Metamaterials: Unlocking Nonlinear Optical Activity".*
Office Action dated Apr. 2, 2013 in Japanese Application No. 2010-058678.
State Intellectual Property Office of People's Republic of China, "The First Office Action," issued in connection with Chinese Patent Application No. 201110069557.7, dated Apr. 18, 2014.
Japanese Patent Office, "Office Action," issued in connection with Japanese Patent Application No. 2010-058678, dated Apr. 30, 2014.
Office Action dated Dec. 17, 2013 in Japanese Application No. 2010-058678.

* cited by examiner

Primary Examiner — Michael Wieczorek
Assistant Examiner — Michael G Miller
(74) Attorney, Agent, or Firm — Sughrue Mion, PLLC

(57) ABSTRACT

A process of preparing a lamination film comprising two or more layers of a fixed cholesteric liquid-crystal phase is disclosed. The process comprises (a) applying a coating liquid of a curable liquid crystal composition comprising a rod-like liquid crystal compound, an alignment-control agent capable of controlling an alignment of the rod-like liquid crystal compound and a solvent to a surface; (b) drying the applied curable liquid crystal composition to form a cholesteric liquid-crystal phase; (c) carrying out a curing reaction of the composition and fixing the cholesteric liquid-crystal phase, thereby to form a lower layer; and (d) repeating the steps (a) to (c) on the lower layer, thereby to form an upper layer; wherein at least a part of the alignment-control agent in the lower layer diffuses into the upper layer.

17 Claims, No Drawings

PROCESS OF PREPARING LAMINATION FILM, LAMINATION FILM AND HEAT SHIELD

CROSS-REFERENCE TO RELATED APPLICATIONS

The present application claims the benefit of priority from Japanese Patent Application No. 2010-058678, filed on Mar. 16, 2010, the contents of which are herein incorporated by reference in their entirety.

BACKGROUND OF THE INVENTION

1. Field of the Invention

The present invention relates to a process of preparing a lamination film having two or more layers of a fixed cholesteric liquid-crystal phase, and a lamination film useful as a light-reflecting film or the like, and a heat shield using the film.

2. Background Art

With the recent increase in interest in environment and energy-related issues, the needs for energy-saving industrial products are increasing; and as one of them, glass and film are desired that are effective for heat shield for windowpanes for houses, automobiles, etc., or that is, effective for reducing heat load due to sunlight. For reducing heat load due to sunlight, it is necessary to prevent transmission of sunlight rays falling within any of the visible range or the infrared range of the sunlight spectrum. In particular, windowpanes for automobiles are required to have high transmittance of visible light from the safety viewpoint, and are additionally required to have a high level of heat shieldability. In some countries, there is a move to control the solar reflectance.

Laminated glass coated with a special metallic film capable of blocking out thermal radiations, which is referred to as Low-E pair glass, is often used as eco-glass having high heat-insulating/heat-shielding capability. The special metallic film may be formed by lamination of plural layers, for example, according to a vacuum-deposition method. The special metallic film formed through vacuum deposition is extremely excellent in reflectivity, but the vacuum process is nonproductive and its production cost is high. In addition, when the metallic film is used, it also blocks electromagnetic waves; and therefore in use in mobile telephones and the like, the metallic film may causes radio disturbance; or when used in automobiles, there may occur a problem in that ETC (electronic toll collection) could not be used. Not only for evading the problem of radio disturbance but also from the safety viewpoint, windowpanes for automobiles are required to have high transmittance of visible light.

There has been provided a method utilizing a cholesteric liquid crystal phase. For example, as disclosed in Japanese Patent No. 4109914, it is possible to reflect the light of from 700 to 1200 nm effectively and selectively by a lamination having a λ/2 plate and, on both of the surfaces of the plate, a cholesteric liquid crystal layer capable of reflecting one circular light.

And, JP-T 2009-514022 discloses an IR-reflective article having a cholesteric liquid-crystal layer. Many trials of using a laminate of plural cholesteric layers in a liquid-crystal display device have been made, and concretely, there are known many trials of efficiently reflecting a light falling within a visible light range. For example, Japanese Patent 3500127 discloses examples of a lamination of a lot of cholesteric layers.

In laminating plural cholesteric layers, there is employed a method of superposing wet coating films of a cholesteric liquid-crystal material one after another through drying, thermal alignment and UV curing thereof. For curing the cholesteric liquid-crystal layer, for example, as exemplified in Japanese patent No. 4008358, there may be generally employed a method of irradiating a polymerizing liquid crystal with UV rays for curing thereof, and for example, there is disclosed a method of forming a wide-area cholesteric liquid-crystal film by controlling the radiation intensity within a predetermined range. Japanese Patent 3745221 discloses a method of forming a continuous wavelength-range polarizing element by laminating plural layers of liquid-crystal molecules to give a multilayer film with so controlling the molecules in each layer as to have the same rotation direction. Japanese Patent 3745221 discloses also an optical element extracting circularly polarized light comprising two cholesteric liquid crystal layers, having different helical pitches and same helical axes, and a transition liquid crystal layer disposed between them. JP-A-2005-115359 discloses a lamination method, and in the method, the fluoroaliphatic-containing copolymer in the first layer may be eluted into the coating composition for forming the second functional layer.

SUMMARY OF THE INVENTION

For obtaining a stable cholesteric liquid crystal phase, it is necessary to control alignment of rod-like liquid crystal molecules. Although it is possible to form a stable cholesteric liquid crystal phase by adding an alignment-control agent to the cholesteric liquid crystal layer, the wettability of the layer containing the agent generally tends to decrease, and therefore, the coating defects such as repelling may sometimes be caused while forming an upper layer on the layer containing the agent.

Accordingly, one object of the present invention is to provide a process capable of preparing a lamination film having two or more layers of a fixed cholesteric liquid crystal phase stably without causing any coating defects such as repelling by a coating method.

The present invention relates also to a lamination film having two or more layers of a fixed cholesteric liquid crystal phase, which can be prepared stably, and to a heat shield using the lamination film.

The means for achieving the above-mentioned object are as follows.

[1] A process of preparing a lamination film comprising two or more layers of a fixed cholesteric liquid-crystal phase comprising:

(a) applying a curable liquid crystal composition comprising a rod-like liquid crystal compound, an alignment-control agent capable of controlling an alignment of the rod-like liquid crystal compound and a solvent to a surface;

(b) drying the applied curable liquid crystal composition to form a cholesteric liquid-crystal phase;

(c) carrying out a curing reaction of the composition and fixing the cholesteric liquid-crystal phase, thereby to form a lower layer; and (d) repeating the steps (a) to (c) on the lower layer, thereby to form an upper layer;

wherein at least a part of the alignment-control agent in the lower layer diffuses into the upper layer.

[2] The process of [1], wherein the alignment-control agent which diffuses from the lower layer into the upper layer is reused in the upper layer as an alignment-control agent for a rod-like liquid crystal compound.

[3] The process of [1] or [2], wherein the concentration of the alignment-control agent for the rod-like liquid crystal compound in the curable liquid crystal composition to be used for forming the upper layer is equal to or smaller than the concentration of the alignment-control agent for the rod-like liquid crystal compound in the curable liquid crystal composition to be used for forming the lower layer.

[4] The process of any one of [1]-[3], wherein the alignment-control agent in the curable liquid crystal composition is localized at an air-interface of the lower layer at the time the (c) step is terminated.

[5] The process of any one of [1]-[4], wherein the degree of diffusion of the alignment-control agent from the lower layer into the upper layer is controlled by adjusting the hardness of the lower layer.

[6] The process of [5], wherein the hardness of the lower layer is adjusted by an irradiation amount of active radiation during carrying out the curing reaction and/or by an amount or concentration of a polymerization initiator contained in the curable liquid crystal composition.

[7] The process of any one of [1]-[6], wherein, in the (c) step, the curing reaction is carried out under a condition so as to allow a part of curable ingredient(s) in the curable liquid crystal composition not to react.

[8] The process of [7], wherein, in the (d) step, the curing reaction of said part of curable ingredient(s) in the lower layer is carried out, thereby increasing the hardness of the lower layer.

[9] The process of any one of [1]-[8], wherein the degree of diffusion of the alignment-control agent from the lower layer into the upper layer is controlled by adjusting the solid content concentration of a coating liquid of the curable liquid crystal composition and/or selecting the solvent.

[10] The process of any one of [1]-[9], wherein at least the alignment-control agent in the curable liquid crystal composition to be used for forming the lower layer is a compound having at least one fluorine atom.

[11] The process of any one of [1]-[10], wherein at least the alignment-control agent in the curable liquid crystal composition to be used for forming the lower layer is a compound having at least one perfluoroalkyl group.

[12] The process of any one of [1]-[12], wherein the alignment-control agent is a compound represented by formula (I), (II), (III) or (IV):

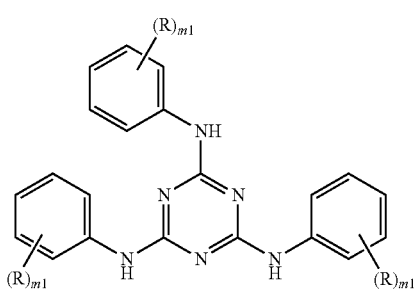

(I)

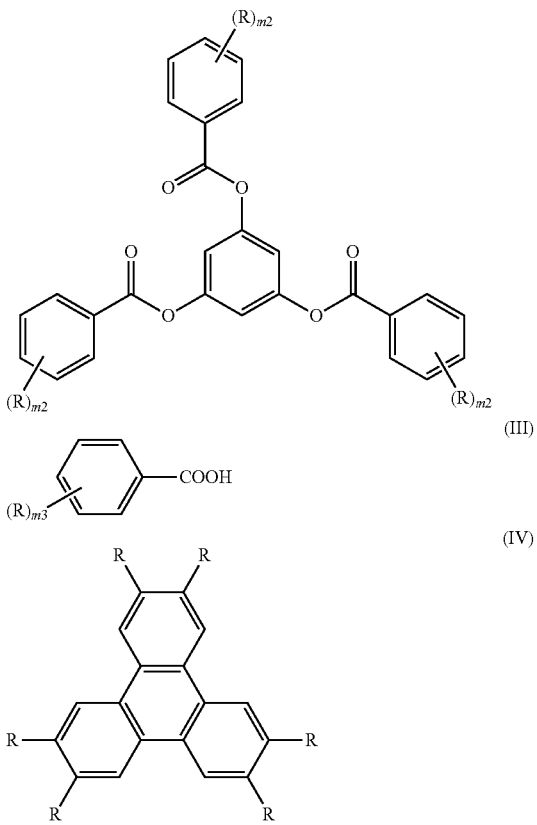

where a plurality of R is same or different and represents a $C_{1-30}$ alkoxy group which may be substituted with at least one fluorine atom, and a $CH_2$ or two or more $CH_2$, which are not adjacent to each other, in the alkoxy group may be replaced with —O—, —S—, —OCO—, —COO—, —NR$^a$—, —NR$^a$CO—, —CONR$^a$—, —NR$^a$SO$_2$—, or —SO$_2$NR$^a$—; R$^a$ represents a hydrogen atom or $C_{1-5}$ alkyl group; and m1, m2, and m3 each represents an integer from 1 to 5.

[13] A lamination film comprising two or more layers of a fixed cholesteric liquid-crystal phase, prepared according to a process of any one of [1]-[12].

[14] A lamination film comprising two or more layers of a fixed cholesteric liquid-crystal phase, wherein each of the two or more layers of a fixed cholesteric liquid-crystal phase comprises at least one compound represented by formula (I), (II), (III) or (IV):

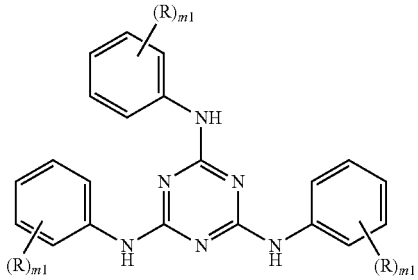

(I)

-continued

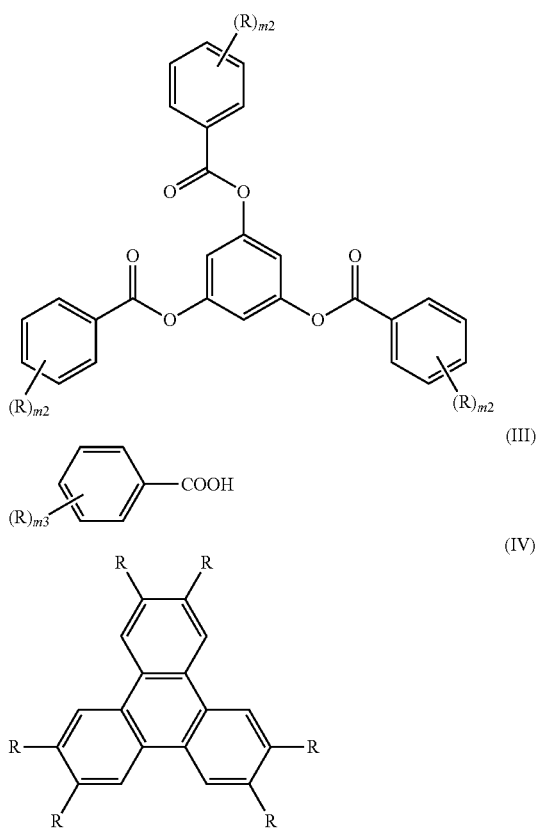

where a plurality of R is same or different and represents a $C_{1-30}$ alkoxy group which may be substituted with at least one fluorine atom, and a $CH_2$ or two or more $CH_2$, which are not adjacent to each other, in the alkoxy group may be replaced with —O—, —S—, —OCO—, —COO—, —$NR^a$—, —$NR^aCO$—, —$CONR^a$—, —$NR^aSO_2$—, or —$SO_2NR^a$—; $R^a$ represents a hydrogen atom or $C_{1-5}$ alkyl group; and m1, m2, and m3 each represents an integer from 1 to 5.

[15] The lamination film of [14], wherein the concentration of the compound in a most-upper layer is higher than the concentration of the compound in any of the one or more layers disposed under the most-upper layer.

[16] The lamination film of [15], wherein the compound of the layer(s) other than the most-upper layer is localized at the contacting face with the upper layer and/or at the interface between the upper layer.

[17] The lamination film of any one of [1]-[16], wherein at least one of the two or more layers is a layer of a fixed right-twisted cholesteric liquid-crystal phase, and at least one of the two or more layers is a layer of a fixed left-twisted cholesteric liquid-crystal phase.

[18] The lamination film of any one of [13]-[17], wherein at least one of the two or more layers is capable of reflecting a part of 800 nm or longer infra-red light

[19] A heat shield formed of or comprising a lamination film of any one of [13]-[18].

According to the invention, it is possible to provide a process capable of preparing a lamination film having two or more layers of a fixed cholesteric liquid crystal phase stably without causing any coating defects such as repelling by a coating method.

And it is also possible to provide a lamination film having two or more layers of a fixed cholesteric liquid crystal phase, which can be prepared stably, and to provide a heat shield using the lamination film.

DETAILED DESCRIPTION OF THE INVENTION

The invention is described in detail hereinunder. In this description, the numerical range expressed by the wording "a number to another number" means the range that falls between the former number indicating the lowermost limit of the range and the latter number indicating the uppermost limit thereof.

The present invention relates to a process of preparing a lamination film comprising two or more layers of a fixed cholesteric liquid-crystal phase comprising, at least, (a) applying a curable liquid crystal composition comprising a rod-like liquid crystal compound, an alignment-control agent capable of controlling an alignment of the rod-like liquid crystal compound and a solvent to a surface;

(b) drying the applied curable liquid crystal composition to form a cholesteric liquid-crystal phase;

(c) carrying out a curing reaction of the composition and fixing the cholesteric liquid-crystal phase, thereby to form a lower layer; and (d) repeating the steps (a) to (c) on the lower layer, thereby to form an upper layer;

wherein at least a part of the alignment-control agent in the lower layer diffuses into the upper layer.

For obtaining a stable cholesteric liquid crystal phase, adding an alignment-control agent to the cholesteric liquid crystal layer is preferable. However, the wettability of the layer containing the agent generally tends to decrease. This is because the agent is localized at the surface of the lower layer and contributes to lowering the surface energy. Therefore, the coating-defects such as repelling may sometimes be caused while forming an upper layer on the lower layer by coating. The present inventors conducted various studies, and as a result, they found that by allowing the alignment-control agent localized at the surface of the lower layer to elute and diffuse into the upper layer, the coating-defects such as repelling were prevented. On the basis of these findings, the present invention was made. The alignment-control agent is eluted from the lower layer into the upper layer, which may increase the surface energy of the lower layer and therefore can prevent the coating-defects such as repelling while forming the upper layer by coating.

Furthermore, the alignment-control agent which elutes and diffuses into the upper layer may be localized at the surface of the upper layer again, and can function as an alignment-control agent in the upper layer again. Namely, the alignment-control agent which elutes and diffuses into the upper layer is used as an alignment-control agent in the upper layer again. According to an embodiment of the invention, a further-upper layer is formed on the upper layer by coating in the same manner. In the embodiment, the alignment-control agent in the upper layer elutes and diffuses into the further-upper layer, and is used as an alignment-control agent again.

The process of the invention is described in detail below.

Step (a):

In step (a), a curable liquid crystal composition comprising a rod-like liquid crystal compound, an alignment-control agent capable of controlling an alignment of the rod-like liquid crystal compound and a solvent is applied to a surface. The curable liquid crystal composition is preferably prepared as a coating liquid containing the solvent. The curable liquid crystal composition is preferably prepared by dissolving and/or dispersing the ingredients into the solvent. The details of the usable ingredients will be described later.

When the most-lower layer is prepared in the (a) step, the liquid crystal composition is applied to a surface of a substrate such as a polymer film, glass plate or quartz plate, or, if necessary, to a surface of an alignment layer formed on the substrate. The coating liquid may be applied to the substrate or the like, according to various methods of a wire bar coating method, an extrusion coating method, a direct gravure coating method, a reverse gravure coating method, a die coating method or the like.

Step (b):

In step (b) step, the applied curable liquid crystal composition is dried to form a cholesteric liquid-crystal phase. In an embodiment where the curable liquid-crystal composition is prepared as a coating liquid that contains a solvent, the coating film may be dried to remove the solvent, thereby the coating film may be made to have the intended cholesteric liquid-crystal phase. If desired, the coating film may be heated up to the transition temperature to the cholesteric liquid-crystal phase. For example, the coating film is once heated up to the temperature of the isotropic phase, and then cooled to the cholesteric liquid-crystal phase transition temperature, whereby the film may stably have the intended cholesteric liquid-crystal phase. The liquid-crystal transition temperature of the curable liquid-crystal composition is preferably within a range of from 10 to 250 degrees Celsius from the viewpoint of the production aptitude, more preferably within a range of from 10 to 150 degrees Celsius. When the temperature is lower than 10 degrees Celsius, the coating film may require a cooling step or the like for cooling it to the temperature range within which the film could exhibit a liquid-crystal phase. On the other hand, when the temperature is higher than 250 degrees Celsius, the coating film may require a higher temperature in order that it could be in an isotropic liquid state at a higher temperature than the temperature range within which the film once exhibits a liquid-crystal phase; and this is disadvantageous from the viewpoint of heat energy dissipation, substrate deformation, degradation, etc.

Step (c):

In step (c), the curing reaction of the composition is carried out and to fix the cholesteric liquid-crystal phase. In this way, a lower layer is formed. The curing reaction may be promoted, for example, by irradiation of active radiation such as UV light. For ultraviolet irradiation, used is a light source of an ultraviolet lamp or the like. In this step, the ultraviolet irradiation promotes the curing reaction of the liquid-crystal composition, and the cholesteric liquid-crystal phase is thereby fixed and the lower layer exhibiting a selective reflectivity characteristic is thus formed.

The energy amount of ultraviolet irradiation is not specifically defined, but in general, it is preferably from 100 mJ/cm$^2$ to 800 mJ/cm$^2$ or so. Not specifically defined, the time for ultraviolet radiation to the coating film may be determined from the viewpoint of both the sufficient hardness of the cured film and the producibility thereof.

For promoting the curing reaction, ultraviolet irradiation may be attained under heat. The temperature in ultraviolet irradiation is preferably kept within a temperature range within which the cholesteric liquid-crystal phase can be kept safely as such with no disturbance. The oxygen concentration in the atmosphere participates in the degree of polymerization of the cured film. Accordingly, in case where the cured film could not have the intended degree of polymerization in air and the film hardness is therefore insufficient, preferably, the oxygen concentration in the atmosphere is lowered according to a method of nitrogen purging or the like. The preferred oxygen concentration is at most 10%, more preferably at most 7%, most preferably at most 3%.

In the above step, the cholesteric liquid-crystal phase is fixed and the light-reflective layer is thereby formed. A most typical and preferred embodiment of the "fixed" liquid-crystal state is such that the alignment of the liquid-crystal compound to form the cholesteric liquid-crystal phase is held as such, to which, however, the invention is not limited. Concretely, the fixed state means that, in a temperature range of generally from 0 to 50 degrees Celsius, or from −30 to 70 degrees Celsius under a severer condition, the layer does not have flowability and does not undergo any alignment morphology change in an external field or by an external force applied thereto, and the layer can continue to stably keep the fixed alignment morphology. In the invention, the alignment state of the cholesteric liquid-crystal phase is fixed through the curing reaction as promoted by ultraviolet irradiation.

In the invention, it is enough that the optical properties of the cholesteric liquid-crystal phase are held in the layer, and finally it is any more unnecessary that the liquid-crystal composition in the light-reflective layer exhibits liquid crystallinity. For example, the liquid-crystal composition may be converted to a high-molecular weight substance and may lose the liquid crystallinity.

Step (d):

In step (d), the above-described steps (a)-(c) are repeated on the lower layer, thereby to form an upper layer. If desired, before carrying out step (d), the lower layer may be cooled.

In step (d), at least a part of the alignment-control agent in the lower layer diffuses into the upper layer. The alignment-control agent which diffuses into the upper layer is distributed highly and localized at the air-interface of the upper layer again, and functions as an alignment-control agent of the rod-like liquid crystal compound. Examples of the alignment-control agent include compounds capable of promoting the horizontal orientation of rod-like liquid crystal molecules. In the invention, the solid content concentration of the alignment-control agent in the curable liquid crystal composition to be used for forming the upper layer is preferably equal to or smaller than the solid content concentration of the curable liquid crystal composition to be used for forming the lower layer. In the upper layer, the alignment-control agent which elutes and diffuses from the lower layer is reused, and therefore, the solid content concentration of the alignment-control agent in the curable liquid crystal composition to be used for forming the upper layer is preferably smaller, compared with that to be used for forming the lower layer. More specifically, the solid content concentration of the alignment-control agent in the curable liquid crystal composition to be used for forming the lower layer is preferably from 0.01 to 10% by mass, more preferably from 0.01 to 5% by mass and even more preferably from 0.02 to 1% by mass. The solid content concentration of the alignment-control agent in the curable liquid crystal composition to be used for forming the upper is preferably an amount obtained by subtracting from the above-mentioned preferable amount by an amount of the agent eluted from the lower layer. However, the embodiment wherein the concentration for the upper layer is same as that for that lower layer may achieve the effect of the invention if the agent diffuses from the lower layer into the upper layer sufficiently.

According to the invention, the degree of diffusion of the alignment-control agent from the lower layer into the upper layer may be controlled by adjusting the hardness of the lower layer. In a cured layer having a high hardness, the degree of polymerization of the polymerizable ingredient(s) in the layer is high, and the molecular network is formed rigidly. In such a cured layer, the alignment-control agent may be trapped in the network, and therefore, an amount of the alignment-control agent to elute into the upper layer may be reduced. Adjusting the hardness of the lower layer allows an appropriate amount of the alignment-control agent to elute into the upper layer. The hardness of the layer may be adjusted by an irradiation amount of active radiation in carrying out the curing reaction and/or by an amount or concentration of a polymerization initiator contained in the curable liquid crystal composition. According to an embodiment of the invention, in the (c) step, the curing reaction is carried out under a condition so as to allow a part of curable ingredient(s) in the curable liquid crystal composition not to react. As a result, the curing reaction of the lower layer is carried out incompletely, and therefore, elution and diffusion of the alignment-control agent into the upper layer is promoted. More specifically, for example, the irradiation energy amount of active radiation for the curing reaction of the lower layer in the (c) step is less than that for the curing reaction of the upper layer in the (c) step irradiation energy amount. For example, in the (c) step for the lower layer, the curing reaction is carried out with the irradiation energy amount of active radiation which is about half of that for carrying out the reaction completely. If the curing reaction is not carried out under the condition, the atmosphere may be replaced with an inactive gas such as nitrogen gas. In the embodiment in which the hardness of the lower layer is low, applying the coating liquid of the liquid crystal composition to the surface of the lower layer, the alignment-control agent localized at the surface of the lower layer may elute and diffuse into the coating liquid easily.

Although the unreacted ingredients remain in the lower layer, the curing of the unreacted ingredients in the lower layer is carried out in the (c) step for the upper layer since the curing reaction in the (c) step for the upper layer is carried out by a higher irradiation energy amount of active radiation. The curing reaction of a part of the residual unreacted ingredients in the lower layer may be carried out not only when the upper layer adjacent to the lower layer is formed but also when the active radiation is irradiated for forming the most-upper layer. According to the embodiment, the hardness of the lower layer is increased, and the lamination film excellent in the durability can be obtained. From this viewpoint, the irradiation energy amount of active radiation for at least forming the most-upper layer is preferably higher than that for forming the lower layer.

The reaction rate of the curing reaction (for example, polymerization) carried out under irradiation of the active radiation for forming the lower layer is preferably from 10 to 80%, or more preferably from 20 to 70%. The measurement of the reaction rate may be performed by comparison of the absorption intensities of the infrared vibration spectrum attributed to the reactive group such as polymerizable group.

Or, by selecting the polymerization initiator or adjusting the concentration thereof, in the (c) step, the curing reaction may be carried out under a condition so as to allow a part of curable ingredient(s) in the curable liquid crystal composition not to react. More specifically, in this embodiment, the polymerization initiators, having a high spectral sensitivity and having a rapid rate of radical-generation, are preferable. Preferable examples of such a polymerization initiator include "IRG-819" and "IRG-907" (Ciba Specialty Chemicals). "IRG-819" has a higher rate of radical-generation and can adjust the reaction rate to the appropriate range more stably, compared with "IRG-907". And using "IRG-819" is more preferable than using "IRG-907" because it allows the alignment-control agent to elute and diffuse from the lower layer into the upper layer more stably.

Or, the degree of diffusion of the alignment-control agent from the lower layer into the upper layer may be controlled by adjusting the solid content concentration of the coating liquid of the curable liquid crystal composition and/or selecting the solvent. For example, the smaller solid content concentration of the coating liquid to be used for forming the upper layer is more preferable because the elution and diffusion of the alignment-control agent from the lower layer can be promoted. In terms of the coating layer-forming, the productive efficiency or the like, the lower limit may be decided. In particular, the solid content concentration is preferably from 10 to 50%, or more preferably from 15 to 40%. The solvent is preferably selected from high-polar solvents because the alignment-control agent can be dissolved in the solvent easily. Preferable examples of the solvent include toluene, methylethylketone and N-methylpyrolidone.

In the invention, the selection of the alignment-control agent is important. In the invention, it is necessary that the alignment-control agent is distributed highly and localized at the air-interface of the layer and contributes to aligning rod-like liquid crystal molecules. The alignment-control agent is localized at the air-interface at the time the curing reaction carried out in the (c) step is completed. Examples of the alignment-control agent tending to localizing at the air-interface include compounds having at least one fluorine atom. Compound having at least one fluorine atom may have the tendency of being distributed highly and localized at the film surface (the air-interface), and may contribute to aligning rod-like liquid crystal molecules with a reduced tilt angle or in a substantially horizontal alignment state. Compounds having at least one perfluoroalkyl group are more preferable.

It is to be noted that a small amount of the alignment-control agent remains in the lower layer although the agent in the lower layer elutes and diffuses into the upper layer. Elution and diffusion of the alignment-control agent into the upper layer may occur partially, and may not occur in whole. The alignment-control agent may still exist in the lower layer, or exist at the interface between the lower and upper layers.

Preferable examples of the alignment-control agent which can be used in the invention include the compounds represented by formulas (I)-(IV). Two or more types of the compounds may be used. The compounds may contribute to aligning rod-like liquid crystal molecules with a reduced tilt angle or in the substantially horizontal alignment state. The compound of formulas (I)-(Iv) are also excellent in diffusion ability from the lower layer into the upper layer, and they are especially useful as an alignment-control agent in the invention.

It is to be understood that the term "horizontal alignment" in the specification means that the direction of long axis of a liquid crystalline molecule is parallel to the layer plane, wherein strict parallelness is not always necessary; and means, in this specification, that a tilt angle of the mean direction of long axes of liquid crystalline molecules with respect to the horizontal plane is smaller than 20°. The layer in which liquid crystal molecules are horizontally aligned at the air-interface may hardly suffer from alignment defects, and may have a high transparency for a visible light and have a high reflection rate. On the other hand, the layer in which liquid crystal molecules are aligned with a large tilt angle may suffer from the finger-print pattern, and may have a low reflective rate, high haze and diffraction characteristics, because of the misalignment between the helical axis of the cholesteric liquid crystal phase and the normal line of the layer surface.

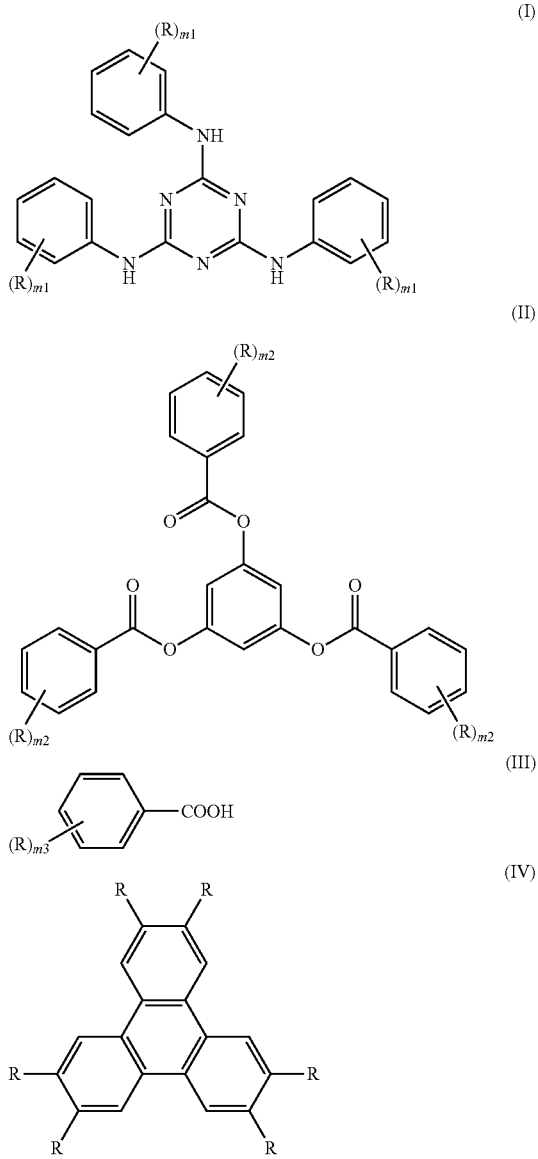

In the formulas, a plurality of R is same or different and represents a $C_{1-30}$, preferably $C_{1-20}$, or more preferably $C_{1-15}$ alkoxy group which may be substituted with at least one fluorine atom. A $CH_2$ or two or more $CH_2$, which are not adjacent to each other, in the alkoxy group may be replaced with —O—, —S—, —OCO—, —COO—, —NR$^a$—, —NR$^a$CO—, —CONR$^a$—, —NR$^a$SO$_2$—, or —SO$_2$NR$^a$—. R$^a$ represents a hydrogen atom or $C_{1-5}$ alkyl group. The compounds having at least one fluorine atom are preferable since they are distributed highly and localized at the air-interface, and elute and diffuse into the upper layer easily. The compounds having the terminal carbon atom having at least one fluorine atom are preferable; and the compounds having at least one perfluoroalkyl group are more preferable.

Examples of "R" include
—OC$_n$H$_{2n+1}$,
—(OC$_2$H$_4$)$_{n1}$(CF$_2$)$_{n2}$F,
—(OC$_3$H$_6$)$_{n1}$(CF$_2$)$_{n2}$F,
—(OC$_2$H$_4$)$_{n1}$NR$^a$SO$_2$(CF$_2$)$_{n2}$F, and
—(OC$_3$H$_6$)$_{n1}$NR$^a$SO$_2$(CF$_2$)$_{n2}$F.

In the formulas, n, n1 and n2 represent an integer of equal to or more than 1 respectively; n is preferably from 1 to 20, or more preferably from 5 to 15; n1 is preferably from 1 to 10, or more preferably from 1 to 5; and n2 is preferably from 1 to 10, or more preferably from 2 to 10.

In the formulas, m1, m2 and m3 represent an integer of equal to or more than 1 respectively In the formula, m1 is preferably 1 or 2, or more preferably 2. When m1 is 1, it preferably links to the para-position; and when m1 is 2, they preferably link to the para- and meta-positions.

In the formula, m2 is preferably 1 or 2, or more preferably 1. When m1 is 1, it preferably links to the para-position; and when m1 is 2, they preferably link to the para- and meta-positions.

In the formula, m3 is preferably from 1 to 3; and a plurality of R preferably links to the para-position and the two meta-positions with respect to the position of —COOH.

Examples of the compound represented by formula (I) include those described in JP-A-2005-99248, [0092]-[0093].

Examples of the compound represented by formula (II) include those described in JP-A-2002-129162, [0076]-[0078] and [0082]-[0085].

Examples of the compound represented by formula (III) include those described in JP-A-2005-99248, [0094]-[0095].

Examples of the compound represented by formula (IV) include those described in JP-A-22005-99248, [0099.

As an alignment-control agent capable of aligning rod-like liquid crystal molecules in a horizontal alignment state, fluorine-containing (meth)acrylate polymers such as those described in JP-A-2006-165995 have been known. Such a polymer may be inferior in diffusion ability into the upper layer from the lower layer, compared with the compounds represented by any one of (I)-(IV).

The liquid crystal composition which can be used in the invention contains at least one rod-like liquid crystal compound along with the alignment-control agent. The composition preferably contains at least one chiral agent and one polymerization initiator for developing a cholesteric liquid crystal phase and for attaining curability respectively.

Rod-like Liquid Crystal Compound:

Examples of the rod-like which can be used in the invention include nematic rod-like liquid crystal compounds. Preferable examples of the nematic rod-like liquid crystal include azomethines, azoxys, cyanobiphenyls, cyanophenyl esters, benzoic acid esters, cyclohexanecarboxylic acid phenyl esters, cyanophenylcyclohexanes, cyano-substituted phenylpyrimidines, alkoxy-substituted phenylpyrimidines, phenyl dioxanes, tolans and alkenylcyclohexyl benzonitriles. In the invention, the liquid crystal compound can be selected from not only low-molecular weight compounds but also high-molecular weight compounds.

The rod-like liquid crystal compound to be used in the invention may be polymerizable or not polymerizable. Examples of the rod-like liquid crystal having no polymerizable group are described in many documents such as Y. Goto et. al., Mol. Cryst. Liq. Cryst. 1995, Vol. 260, pp. 23-28.

A polymerizable rod-like liquid crystal compound may be prepared by introducing a polymerizable group in rod-liquid crystal compound. Examples of the polymerizable group include an unsaturated polymerizable group, epoxy group, and aziridinyl group; and an unsaturated polymerizable group is preferable; and an ethylene unsaturated polymerizable group is especially preferable. The polymerizable group may be introduced in a rod-like liquid crystal compound according to any method. The number of the polymerizable group in the polymerizable rod-like liquid crystal compound is preferably from 1 to 6 or more preferably from 1 to 3. Examples of the polymerizable rod-like liquid crystal compound include those described in Makromol. Chem., vol. 190, p. 2255 (1989), Advanced Materials, vol. 5, p. 107 (1993), U.S. Pat. Nos. 4,683,327, 5,622,648, 5,770,107, WO95/22586, WO95/24455, WO97/00600, WO98/23580, WO98/52905, JPA No. 1-272551, JPA No. 6-16616, JPA No. 7-110469, JPA No. 11-80081 and JPA No. 2001-328973. Plural types of polymerizable rod-like liquid crystal compounds may be used in combination. Using plural types of polymerizable rod-like liquid crystal compounds may contribute to lowering the alignment temperature.

Optically-Active Compound (Chiral Agent):

The liquid crystal composition is preferably capable of forming a cholesteric liquid crystal phase, and preferably contains at least one optically-active compound. However, if the rod-like liquid crystal compound having a chiral carbon in its molecule is used, some of the compositions containing such a rod-like liquid crystal compound may be capable of stably forming a cholesteric liquid crystal phase even if they don't contain any optically-active compound. The optically-active compound may be selected from any known chiral agents such as those used in twisted-nematic (TN) and super-twisted-nematic (STN) modes, which are described, for example, in "Ekisho Debaisu Handobukku (Liquid Crystal Device Handbook)", Third Chapter, 4-3 Chapter, p. 199, edited by No. 142 Committee of Japan Society for the Promotion of Science, published by the Nikkan Kogyo Shimbun, Ltd., in 1989. Although, generally, an optically-active compound has a chiral carbon in its molecule, axially chiral compounds and planar chiral compound, having no chiral carbon, may be used as a chiral compound in the invention. Examples of the axially chiral compound or the planar chiral compound include binaphthyl, helicene, paracyclophane and derivatives thereof. The optically-active compound (chiral compound) may have at least one polymerizable group. Using a polymerizable optically-active compound along with a polymerizable rod-like compound, it is possible to obtain a polymer having repeating units derived from the optically-active compound and the rod-like liquid crystal compound respectively by carrying out the polymerization thereof. In such an embodiment, the polymerizable group in the optically-active compound is preferably same as that in the rod-like liquid crystal compound. Accordingly, the polymerizable group in the optically-active compound is preferably selected from an unsaturated polymerizable group, epoxy group and aziridinyl group; and an unsaturated polymerizable group is preferable; and an ethylene unsaturated polymerizable group is especially preferable.

The optically-active compound may be selected from liquid crystal compounds.

An amount of the optically-active compound is preferably from 1 to 30% by mole with respect to an amount of the rod-like liquid crystal compound used along with it. A smaller amount of the optically-active compound is more preferable since influence thereof on liquid crystallinity may be small. Accordingly, optically-active compounds having a strong helical twisting power are preferable since they may achieve the desired helical pitch by being added in a small amount. Examples of such an optically-active compound having a strong helical twisting power include those described in JPA 2003-287623.

Polymerization Initiator:

The liquid crystal composition to be used for preparing each of the light-reflective layers is preferably a polymerizable liquid crystal composition; and on its own, the composition preferably contains at least one polymerization initiator. According to the invention, the polymerization may be carried out under irradiation of ultraviolet light, and the polymerization initiator is preferably selected from photo-polymerization initiators capable of initiating polymerizations by irradiation of ultraviolet light. Examples of the photo-polymerization initiator include α-carbonyl compounds (those described in U.S. Pat. Nos. 2,367,661 and 2,367,670), acyloin ethers (those described in U.S. Pat. No. 2,448,828), α-hydrocarbon-substituted aromatic acyloin compounds (those described in U.S. Pat. No. 2,722,512), polynuclear quinone compounds (those described in U.S. Pat. Nos. 3,046,127 and 2,951,758), combinations of tri-arylimidazole dimer and p-aminophenyl ketone (those described in U.S. Pat. No. 3,549,367), acrydine and phenazine compounds (those described in Japanese Laid-Open Patent Publication "Tokkai" No. S60-105667 and U.S. Pat. No. 4,239,850), and oxadiazole compounds (those described in U.S. Pat. No. 4,212,970).

An amount of the photo-polymerization initiator is preferably from 0.1 to 20% by mass, more preferably from 1 to 8% by mass, with respect to the liquid crystal composition (the solid content when the composition is a coating liquid).

Furthermore, the liquid crystal composition may contain at least one additive selected from any additives such as homogenous-alignment promoter, anti-unevenness agent, anti-repelling agent and polymerizable monomer for improving the uniformity of alignment, the coating property or the film hardness. If necessary, the liquid crystal composition may contain any polymerization inhibitor, antioxidant, ultraviolet absorber, light-stabilization agent, colorant, fine particles of metal oxide or the like in an amount unless the optical properties thereof are lowered.

By performing the above-mentioned steps (a)-(d), it is possible to prepare the lamination film having two layers of a fixed cholesteric liquid crystal phase. Furthermore, by repeating the steps (a)-(c) one or more times on the upper layer formed in the (d) step, it is possible to prepare the lamination film having three or more layers formed of a fixed cholesteric liquid crystal phase. One example of the lamination film prepared according to the process of the present invention is a lamination film comprising two or more layers of a fixed cholesteric liquid-crystal phase, wherein each of the two or more layers of a fixed cholesteric liquid-crystal phase comprises at least one compound represented by formula (I), (II), (III) or (IV). One feature of the lamination film prepared according to the process of the present invention resides in that the concentration of the alignment-control agent in a most-upper layer is higher than the concentration of the alignment-control agent in any of the one or more layers disposed under the most-upper layer. This is because the alignment-control agent in the lower layer elutes and diffuses into the upper layer disposed thereon, and is reused as an alignment-control agent, according to the process of the invention. Another feature of the lamination film prepared according to the process of the present invention resides in that the compound of the layer(s) other than the most-upper layer is localized at the contacting face with the upper layer and/or at the interface between the upper layer.

The lamination film of the invention exhibits the selective reflectivity characteristics attributed to the cholesteric liquid-crystal phase in each of the layers. The lamination film of the invention may have either of the layer of a fixed right-twisted cholesteric liquid crystal phase or the layer of a fixed right-twisted cholesteric liquid crystal phase. The lamination film having both of the layers of a fixed right-twisted cholesteric liquid crystal phase and a fixed left-twisted cholesteric liquid crystal phase of which helical pitches are same exhibits a high reflection rate for the light of the specified wavelength, and is preferable. The lamination film, having a plurality of the pair of the layers of a fixed right-twisted cholesteric liquid crystal phase and a fixed left-twisted cholesteric liquid crystal phase of which helical pitches are same, exhibits not only a high reflection rate but also a wide selective reflectivity characteristics, and is preferable.

The twisting direction of the cholesteric liquid crystal phase may be adjusted by selecting the rod-like liquid crystal or the chiral agent; and the helical pitch may be adjusted by controlling the concentrations thereof.

The wavelength of selective reflection wavelength is not limited. The desired reflection characteristics for light of the specified wavelength may be obtained by adjusting the helical pitch depending on the application. One example of the lamination film is a so-called infrared light reflecting film having at least one layer capable of reflecting a part of 800 nm or longer infrared light. The lamination film is used alone or along with a substrate supporting the film as a heat shield.

The heat shielding member may have a substrate, and the substrate may not be limited in terms of materials or optical properties as long as it is self-supporting and can support the lamination film. In some applications, the substrate may be required to have a high transmission for a visible light. The substrate may be selected from specific retardation plates such as a λ/2 plate, which are produced according to the method controlled for obtaining the specific optical properties; or the substrate may be selected from polymer films of which variation in in-plane retardation is large, more particularly, variation in Re (1000), which is in-plane retardation at a wavelength of 1000 nm, is equal to or more than 20 nm or 100 nm, which cannot be used as a specific retardation plate. For example, a retarder or the like of which in-plane retardation at a wavelength of 1000 nm, Re(1000) is from 800 to 1300 nm may be used.

Polymer films having a high transmission for a visible light include those used in display devices such as a liquid crystal display device as an optical film. Preferable examples of the polymer film which can be used as a substrate include poly ester films such as polyethylene terephthalate (PET), polybutylene and polyethylene naphthalate (PEN) films; polycarbonate (PC) films; polymethylmethacrylate films; polyolefin films such as polyethylene and polypropylene films; polyimide films, triacetyl cellulose (TAC) films. Polyethylene terephthalate films and triacetyl cellulose films are preferable.

The lamination film of the invention may be inserted into a laminated glass and used as a heat shield.

The heat shield may be stuck on the windows of building structures such as houses, office buildings, etc., or to the windows of vehicles such as automobiles, etc., as a sunlight-shielding member. In addition, the heat shield may be used directly as a sunlight-shielding member by itself (for example, as heat-shielding glass, heat-shielding film).

EXAMPLES

Paragraphs below will further specifically describe features of the present invention, referring to Examples and Comparative Examples. Any materials, amount of use, ratio, details of processing, procedures of processing and so forth shown in Examples may appropriately be modified without departing from the spirit of the present invention. Therefore, it is to be understood that the scope of the present invention should not be interpreted in a limited manner based on the specific examples shown below.

[Preparation of Coating Liquid (Liquid-Crystal Composition)]

A coating liquid having the formulation shown in the following Table was prepared.

| Materials (types) | Name (producer) | Amount (parts by mass) |
|---|---|---|
| Rod-like liquid crystal compound | RM-257 (Merck) | 100 |
| Chiral agent | LC-756 (BASF) | 3.33 |
| Polymerization initiator | Shown in the following tables | 4.0 |
| Alignment controlling agent | Shown in the following tables | |
| Solvent | 2-butanone (Wako) | 156.05 |
| Solid Content Concentration | Shown in the following tables | |

(a) Using a wire bar, the prepared coating liquid was applied onto a FUJIFILM's PET film so as to have a dry thickness of 5 micro meters, at room temperature.

(b) This was dried at room temperature for 30 seconds, and then heated in an atmosphere at 85 degrees Celsius for 4 minutes to form a cholesteric liquid-crystal phase.

(c) Then, using a metal halide lamp (EYE GRAPHICS Co., Ltd.) of which output was controlled, this was UV-irradiated at 30 degrees Celsius under a condition (for example, with or without nitrogen gas purge or an irradiation amount) shown in the following tables, thereby fixing the cholesteric liquid-crystal phase and forming a first layer (lower layer).

(d) After the first layer was cooled down by the room temperature, the steps (a)-(c) were repeated, thereby forming a second layer (upper layer).

Each of the lamination film samples was subjected to a visual check for evaluation of whether the repelling in the second layer (upper layer) was caused or not.

Whether the alignment-control agent in the lower layer eluted and diffused into the upper layer was confirmed by liquid chromatography measuring the concentration of the alignment-control agent of the sample liquid which was prepared by immersing the layer in a solvent. And the quality of the alignment was decided depending on whether the alignment defect was found or not in the sample under a polarizing microscope The sample layers were prepared in the same manner as the first layers of the examples respectively, and their reaction rates were measured. All of the reaction rates were within the range from about 45% to about 55%.

The results are shown in the following tables.

| Lamination Film No. | Alignment-Control Agent | Concentration of Alignment-Control Agent | Polymerization Initiator | Solid Content Concentration | Curing Condition | | Evaluation |
|---|---|---|---|---|---|---|---|
| Comparative Example 1 | Compound 4[*1] | First Layer 0.03 | IRG 819[*2] | 40 | First Layer: $N_2$ gas purge Irradiation amount: 826 mJ/cm$^2$ | X | No alignment-control agent was eluted from the first layer into the |
| | | Second Layer 0.03 | | | Second Layer: $N_2$ gas purge Irradiation amount: 826 mJ/cm$^2$ | | second layer. Repelling was caused in forming the second layer under heat. |
| Example 1 | Compound 4[*1] | First Layer 0.03 | IRG 819[*2] | 40 | First Layer: $N_2$ gas purge Irradiation amount: 404 mJ/cm$^2$ | ○ | The alignment-control agent was eluted from the first layer into the |
| | | Second Layer 0.03 | | | Second Layer: $N_2$ gas purge Irradiation amount: 826 mJ/cm$^2$ | | second layer. No repelling was caused in forming the second layer. The alignment was good. |
| Example 2 | Compound 4[*1] | First Layer 0.03 | IRG 819[*2] | 40 | First Layer: $N_2$ gas purge Irradiation amount: 404 mJ/cm$^2$ | ○~⊙ | The alignment-control agent was eluted from the first layer into the |
| | | Second Layer 0.01 | | | Second Layer: $N_2$ gas purge Irradiation amount: 826 mJ/cm$^2$ | | second layer. No repelling was caused in forming the second layer. The alignment was very good. |
| Example 3 | Compound 4[*1] | First Layer 0.03 | IRG 819[*2] | 35 | First Layer: $N_2$ gas purge Irradiation amount 404 mJ/cm$^2$ | ⊙ | The alignment-control agent was eluted from the first layer into the |
| | | Second Layer 0.01 | | | Second Layer: $N_2$ gas purge Irradiation amount: 826 mJ/cm$^2$ | | second layer. No repelling was caused in forming the second layer. The alignment was very good. |
| Example 4 | Compound 5[*1] | First Layer 0.03 | IRG 819[*2] | 40 | First Layer: $N_2$ gas purge Irradiation amount: 404 mJ/cm$^2$ | ○ | The alignment-control agent was eluted from the first layer into the |
| | | Second Layer 0.01 | | | Second Layer: $N_2$ gas purge Irradiation amount: 826 mJ/cm$^2$ | | second layer. No repelling was caused in forming the second layer. The alignment was good. |

[*1]The compounds are shown below
[*2]manufactured by Ciba Specialty Chemicals

| Lamination Film No. | Alignment-Control Agent | Concentration of Alignment-Control Agent | Polymerization Initiator | Solid Content Concentration | Curing Condition | | Evaluation |
|---|---|---|---|---|---|---|---|
| Example 5 | Compound 6[*1] | First Layer 0.03 | IRG 819[*2] | 40 | First Layer: $N_2$ gas purge Irradiation amount: 404 mJ/cm$^2$ | Δ | The alignment-control agent was eluted from the first layer into the |
| | | Second Layer 0.01 | | | Second Layer: $N_2$ gas purge Irradiation amount: 826 mJ/cm$^2$ | | second layer. No repelling was caused in forming the second layer. The alignment was almost good. |
| Example 6 | Compound 7[*1] | First Layer 0.03 | IRG 819[*2] | 40 | First Layer: $N_2$ gas purge Irradiation amount: 404 mJ/cm$^2$ | ○ | The alignment-control agent was eluted from the first layer into the |
| | | Second Layer 0.01 | | | Second Layer: $N_2$ gas purge Irradiation amount: 826 mJ/cm$^2$ | | second layer. No repelling was caused in forming the second layer. The alignment was good. |
| Example 7 | Compound 8[*1] | First Layer 0.03 | IRG 819[*2] | 40 | First Layer: $N_2$ gas purge Irradiation amount: 404 mJ/cm$^2$ | ○ | The alignment-control agent was eluted from the first layer into the |
| | | Second Layer 0.01 | | | Second Layer: $N_2$ gas purge Irradiation amount: 826 mJ/cm$^2$ | | second layer. No repelling was caused in forming the second layer. The alignment was good. |
| Example 8 | Compound 9[*1] | First Layer 0.03 | IRG 819[*2] | 40 | First Layer: $N_2$ gas purge Irradiation amount: 404 mJ/cm$^2$ | ○ | The alignment-control agent was eluted from the first layer into the |
| | | Second Layer 0.01 | | | Second Layer: $N_2$ gas purge Irradiation amount: 826 mJ/cm$^2$ | | second layer. No repelling was caused in forming the second layer. The alignment was good. |

-continued

| Lamination Film No. | Alignment-Control Agent | Concentration of Alignment-Control Agent | Polymerization Initiator | Solid Content Concentration | Curing Condition | Evaluation | |
|---|---|---|---|---|---|---|---|
| Example 9 | Compound 4*[1] | First Layer 0.03  Second Layer 0.01 | IRG 907*[2] | 40 | First Layer: N$_2$ gas purge Irradiation amount: 404 mJ/cm$^2$  Second Layer: N$_2$ gas purge Irradiation amount: 826 mJ/cm$^2$ | Δ | The alignment-control agent was eluted from the first layer into the second layer. No repelling was caused in forming the second layer. The alignment was almost good. |
| Comparative Example 2 | Compound 10*[1] | First Layer 0.03  Second Layer 0.01 | IRG 819*[2] | 40 | First Layer: N$_2$ gas purge Irradiation amount: 404 mJ/cm$^2$  Second Layer: N$_2$ gas purge Irradiation amount: 826 mJ/cm$^2$ | X | No alignment-control agent was eluted from the first layer into the second layer. Repelling was caused in forming the second layer under heat. |

*[1]The compounds are shown below
*[2]manufactured by Ciba Specialty Chemicals

Compound 4,5

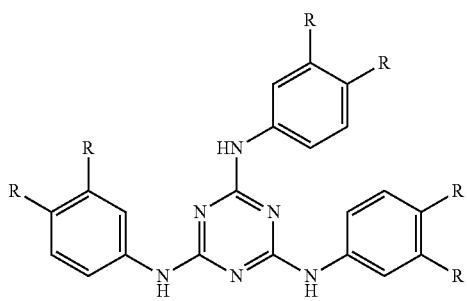

Compound 4  R = O(CH$_2$)$_2$O(CH$_2$)$_2$(CF$_2$)$_6$F
Compound 4  R = O(CH$_2$)$_{12}$H Compound 6

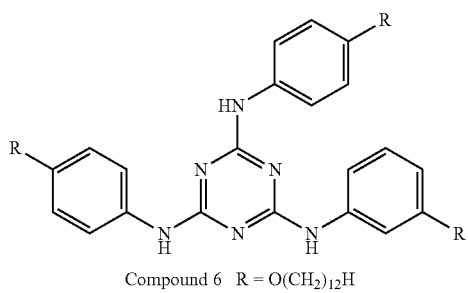

Compound 6  R = O(CH$_2$)$_{12}$H

Compound 7

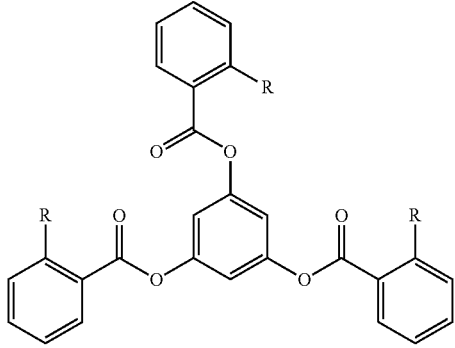

Compound 7  R = O(CH$_2$)$_2$N(n-C$_3$H$_7$)SO$_2$(CF$_2$)$_8$F

Compound 8

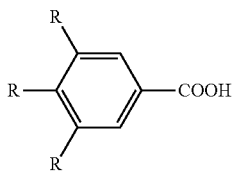

Compound 8  R = O(CH$_2$)$_2$O(CH$_2$)$_2$(CF$_2$)$_6$F

Compound 9

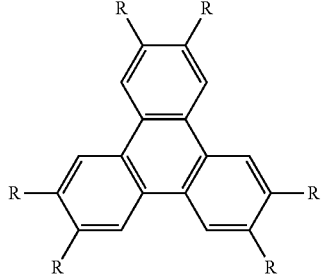

Compound 9  R = O(CH$_2$)$_2$O(CH$_2$)$_2$(CF$_2$)$_6$F

-continued

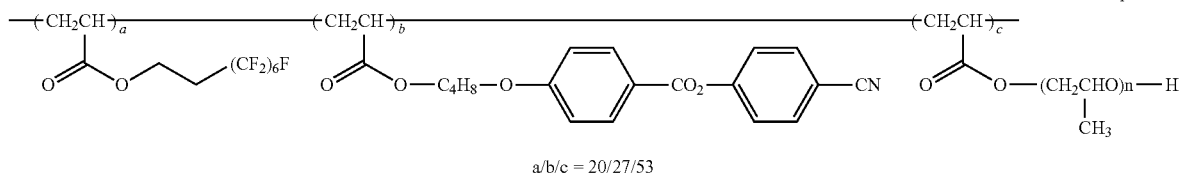

Compound 10 a/b/c = 20/27/53

The invention claimed is:

1. A process of preparing a lamination film comprising two or more layers of a fixed cholesteric liquid-crystal phase comprising, at least, (a) applying a curable liquid crystal composition comprising a rod-like liquid crystal compound, an alignment-control agent capable of controlling an alignment of the rod-like liquid crystal compound and a solvent to a surface, wherein the curable liquid crystal composition comprises a chiral agent capable of controlling a twisting direction and/or helical pitch of a cholesteric liquid-crystal phase; and wherein the alignment-control agent is capable of localizing at a film surface and aligning the direction of a long axis of molecules of the rod-like liquid crystal compound parallel to the layer plane;

(b) drying the applied curable liquid crystal composition to form a cholesteric liquid-crystal phase;

(c) carrying out a curing reaction of the composition and fixing the cholesteric liquid-crystal phase, thereby to form a lower layer; and (d) repeating the steps (a) to (c) on the lower layer, thereby to form an upper layer;

wherein at least a part of the alignment-control agent in the lower layer diffuses into the upper layer after the upper layer curable liquid crystal composition is applied to the lower layer, but before the upper layer curable liquid crystal composition is exposed to the curing reaction, and the degree of diffusion of the alignment-control agent from the lower layer into the upper layer is controlled by adjusting the hardness of the lower layer, or the degree of diffusion of the alignment-control agent from the lower layer into the upper layer is controlled by adjusting the solid content concentration of the upper layer curable liquid crystal composition of the curable liquid crystal composition and/or selecting the solvent.

2. The process of claim 1, wherein the alignment-control agent which diffuses from the lower layer into the upper layer is reused in the upper layer as an alignment-control agent for a rod-like liquid crystal compound.

3. The process of claim 1, wherein the concentration of the alignment-control agent for the rod-like liquid crystal compound in the curable liquid crystal composition to be used for forming the upper layer is equal to or smaller than the concentration of the alignment-control agent for the rod-like liquid crystal compound in the curable liquid crystal composition to be used for forming the lower layer.

4. The process of claim 1, wherein the alignment-control agent in the curable liquid crystal composition is localized at an air-interface of the layer at the time the (c) step is terminated.

5. The process of claim 1, wherein the degree of diffusion of the alignment-control agent from the lower layer into the upper layer is controlled by adjusting the hardness of the lower layer.

6. The process of claim 5, wherein the hardness of the lower layer is adjusted by an irradiation amount of active radiation during carrying out the curing reaction and/or by an amount or concentration of a polymerization initiator contained in the curable liquid crystal composition.

7. The process of claim 1, wherein, in the (c) step, the curing reaction is carried out under a condition so as to allow a part of curable ingredient(s) in the curable liquid crystal composition not to react.

8. The process of claim 7, wherein, in the (d) step, the curing reaction of said part of curable ingredient(s) in the lower layer is carried out, thereby increasing the hardness of the lower layer.

9. The process of claim 1, wherein the degree of diffusion of the alignment-control agent from the lower layer into the upper layer is controlled by adjusting the solid content concentration of the upper layer curable liquid crystal composition of the curable liquid crystal composition and/or selecting the solvent.

10. The process of claim 1, wherein at least the alignment-control agent in the curable liquid crystal composition to be used for forming the lower layer is a compound having at least one fluorine atom.

11. The process of claim 1, wherein at least the alignment-control agent in the curable liquid crystal composition to be used for forming the lower layer is a compound having at least one perfluoroalkyl group.

12. The process of claim 1, wherein the alignment-control agent is a compound represented by formula (I), (II), (III) or (IV):

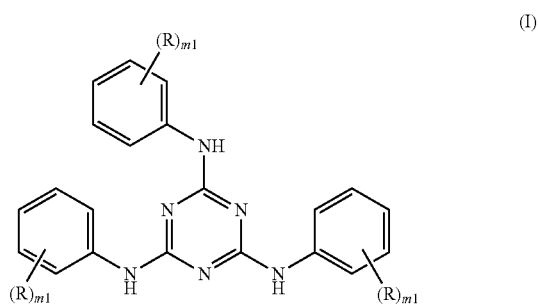

(I)

-continued

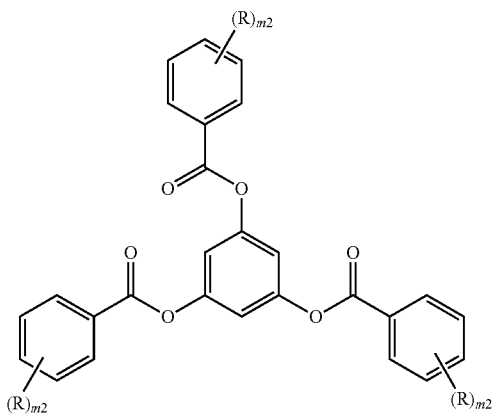
(II)

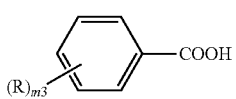
(III)

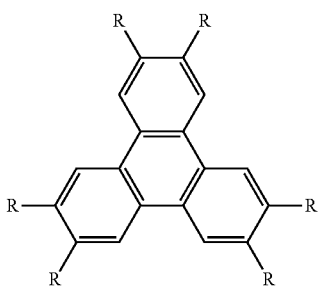
(IV)

where a plurality of R is same or different and represents a $C_{1-30}$ alkoxy group which may be substituted with at least one fluorine atom, and a $CH_2$ or two or more $CH_2$, which are not adjacent to each other, in the alkoxy group may be replaced with —O—, —S—, —OCO—, —COO—, —NR$^a$—, —NR$^a$CO—, —CONR$^a$—, —NR$^a$SO$_2$—, or —SO$_2$NR$^a$—; R$^a$ represents a hydrogen atom or $C_{1-5}$ alkyl group; and m1, m2, and m3 each represents an integer from 1 to 5.

13. The process of claim 1, wherein the curing reactions comprise irradiation of the curable liquid crystal compositions and the irradiation energy amount of active radiation for the curing reaction of the lower layer in the (c) step is less than that for the curing reaction of the upper layer in the (c) step irradiation energy amount.

14. The process of claim 1, wherein the degree of diffusion of the alignment-control agent from the lower layer into the upper layer is controlled by adjusting the solid content concentration of the upper layer curable liquid crystal composition of the curable liquid crystal composition to 35%.

15. The process of claim 1, wherein the alignment-control agent is a compound represented by formula (II):

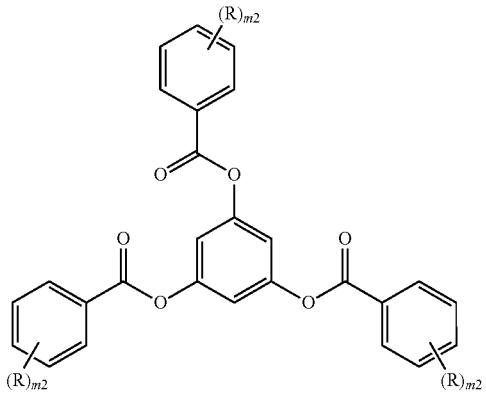
(II)

wherein a plurality of Rs are the same or different from each other and each independently represents a $C_{1-30}$ alkoxy group which may be substituted with at least one fluorine atom, and a $CH_2$ or two or more $CH_2$, which are not adjacent to each other, in the alkoxy group may be replaced with —O—, —S—, —OCO—, —COO—, —NR$^a$—, —NR$^a$CO—, —CONR$^a$—, —NR$^a$SO$_2$—, or —SO$_2$NR$^a$—; R$^a$ represents a hydrogen atom or $C_{1-5}$ alkyl group; and m2 represents an integer from 1 to 5.

16. The process of claim 1, wherein the alignment-control agent is Compound 7:

Compound 7

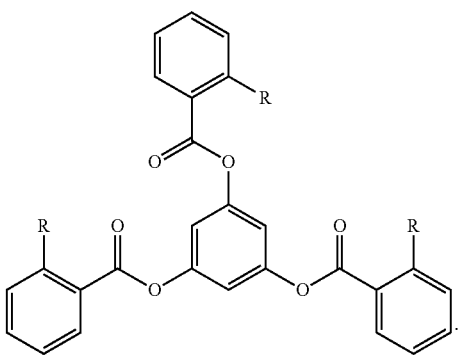

R = O(CH$_2$)$_2$N(n-C$_3$H$_7$)SO$_2$(CF$_2$)$_8$F

17. The process of claim 1, wherein the alignment-control agent is Compound 6:

Compound 6

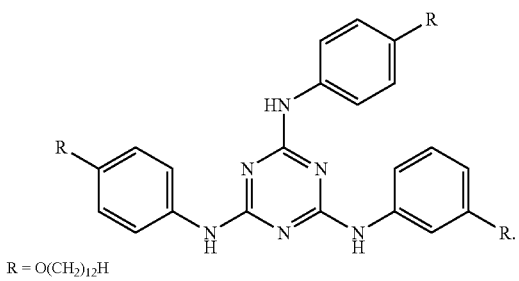

R = O(CH$_2$)$_{12}$H

* * * * *